(12) United States Patent
Kraimer et al.

(10) Patent No.: US 6,257,645 B1
(45) Date of Patent: Jul. 10, 2001

(54) FLOORBOARD FOR A VEHICLE

(75) Inventors: James V. Kraimer, New Bremen; Larry A. Niemeyer, New Knoxville, both of OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 09/382,712

(22) Filed: Aug. 24, 1999

(51) Int. Cl.⁷ .................................................. B62D 25/20
(52) U.S. Cl. ...................................... 296/97.23; 296/39.1
(58) Field of Search .................... 296/193, 39.1, 296/97.23; 16/4; 52/177

(56) References Cited

U.S. PATENT DOCUMENTS

| | | | |
|---|---|---|---|
| 4,829,627 | * 5/1989 | Altus et al. | 296/97.23 X |
| 5,573,294 | * 11/1996 | Mack | 296/97.23 |
| 5,579,859 | 12/1996 | Quellhorst et al. | |
| 5,887,931 | * 3/1999 | Bills et al. | 296/39.1 |

* cited by examiner

Primary Examiner—D. Glenn Dayoan
Assistant Examiner—Jason Morrow
(74) Attorney, Agent, or Firm—King and Schickli PLLC

(57) ABSTRACT

Rigid floor panels define side edge channels which receive ribs formed on side edges of elastic mats so that the mats can be secured quickly to a floor panel, preferably without the need for adhesives, by engagement of the ribs with the channels. Pull tabs are formed on the mats to further secure the mats to the floor panels by extension through corresponding holes passing through the floor panels. Such pull tabs or some adhesive may be necessary for further securing the mats to the floor panels particularly when the floorboard is formed as two pieces and when the channels are one-sided. The shape and sizing of the ribs are such that they define matted floor corner edges giving the benefits of prior art matted floorboards but with substantially extended life expectancy.

35 Claims, 4 Drawing Sheets

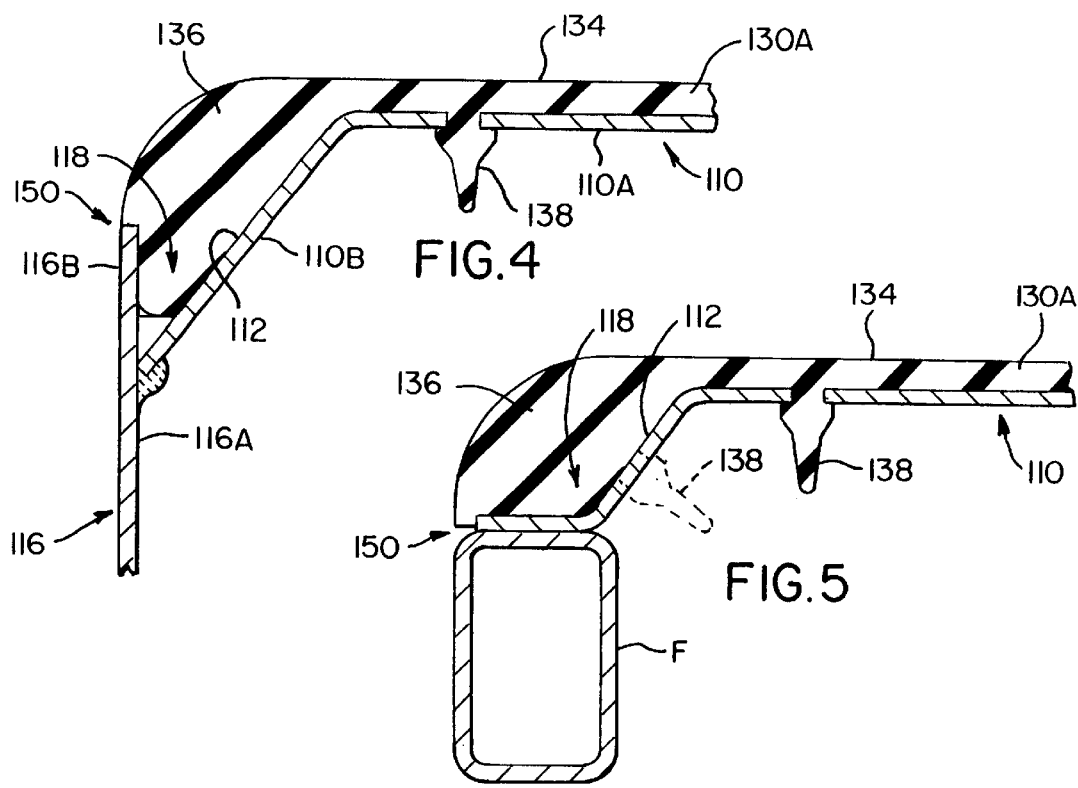
FIG. 4
FIG. 5
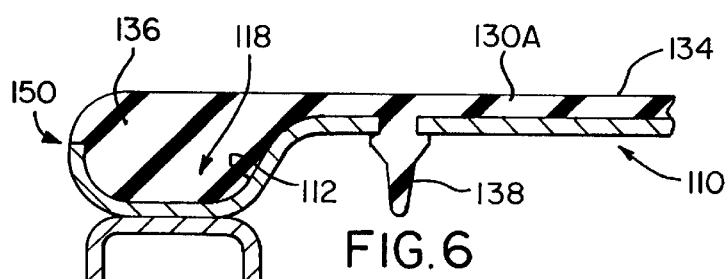
FIG. 6
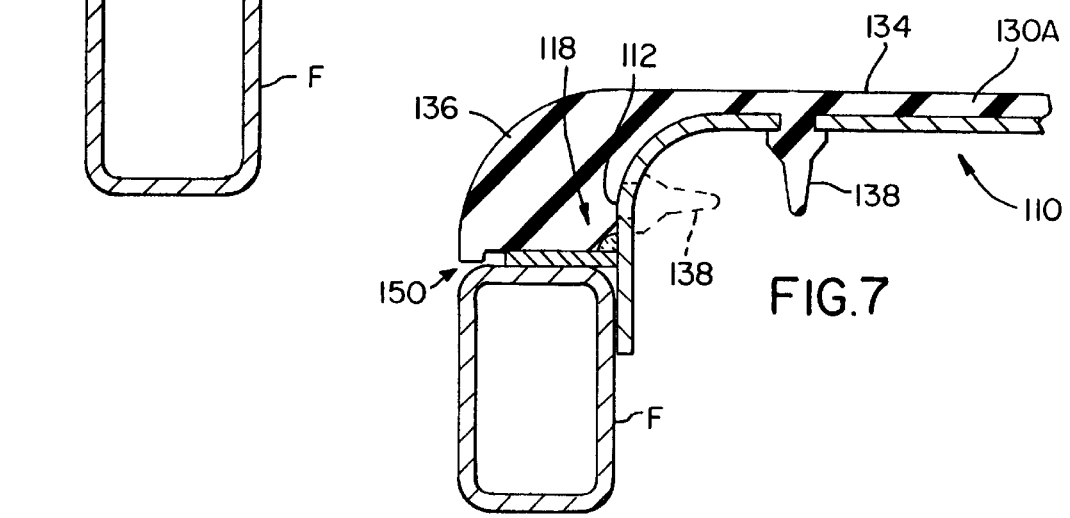
FIG. 7

FLOORBOARD FOR A VEHICLE

BACKGROUND OF THE INVENTION

The present invention relates in general to mat covered vehicle floors and, more particularly, to a floorboard arrangement for vehicles wherein flexible mats are secured to rigid floor panels by means of ribs on side edges of the mats which engage channels on the side edges of floor panels, preferably without the use of adhesives. While the invention is generally applicable, it will be described herein with reference to materials handling vehicles for which it is initially being used.

A materials handling vehicle, such as a fork lift truck, includes a floor which an operator's feet engage during standing or seated operation of the vehicle and upon entry into and egress from the vehicle. These floors are typically formed from metal and covered with a flexible mat. The mat provides some amount of cushioning, which can be important for vehicles operated from a sitting position as well as a standing or perched (partially standing) position, and also provides improved footing. Thus, prior art mats have been installed onto the upper surfaces of metal vehicle floors to provide these benefits while the operator is in the vehicle. Typically, the mats are secured to the floors by adhesives or pull tabs.

When stepping into the vehicle, commonly an operator will step onto a corner edge of the floor. Accordingly, it is desirable to extend the mat over the corner edge of the floor to provide at least improved traction when the corner is engaged by operators' feet. While floor mats adhesively secured to a flat upper surface of a floor normally perform satisfactorily and provide long mat life, unfortunately when a mat is adhered around a corner of a floor, even if the floor corner is rounded, the mat tends to separate from the floor and oftentimes requires early repair or replacement. An additional problem is encountered during production of the vehicles since the gluing operation requires substantial time and effort which can cause delays on a modern day production line. When pull-tabs alone are used to secure floor mats to the upper surface of a floor, there is currently no way to wrap the mat around the floor edge without having it separate from the floor.

Accordingly, there is a need for an improved floorboard for vehicles, such as materials handling vehicles, wherein a mat can be secured quickly to a floor panel, preferably without the use of adhesives. It is desirable that the improved floorboard also provide matted floor corner edges which would provide the known benefits without the problems encountered with prior art matted floorboards.

SUMMARY OF THE INVENTION

This need is met by the invention of the present application wherein rigid floor panels define side edge channels which receive ribs formed on side edges of elastic mats so that the mats can be secured quickly to the floor panels, preferably without the need for adhesives, by engagement of the ribs with the channels. Pull tabs may be formed on the mats to further secure the mats to the floor panels by extension through corresponding holes passing through the floor panels. Such pull tabs or some adhesive may be necessary for further securing the mats to the floor panels particularly when the floorboard is formed as two pieces, for example as illustrated in the present application, and when the channels are one-sided. The shape and sizing of the ribs are such that they provide matted floor corner edges giving the benefits of prior art matted floorboards but with substantially extended life expectancy.

In accordance with one aspect of the present invention, a floorboard for a vehicle comprises a rigid structure defining a substantially flat upper surface of a floor for the vehicle and a channel adjacent a side edge of the substantially flat upper surface of the floor. A resilient member defines an upper surface of the floorboard and a rib along a side edge of the upper surface of the floorboard. The rib is configured to be received within the channel for at least partially securing the resilient member to the rigid structure. The floorboard may be made from rubber or other appropriate material. In the illustrated embodiment, the rigid structure comprises a first member defining the substantially flat upper surface of the floor for the vehicle and the side edge of the substantially flat upper surface, and a second member which, together with the side edge of the first member, defines the channel. The second member may be integral with the first member or secured to the first member. The resilient member may further comprise pull tabs extending therefrom for further securing the resilient member to the rigid structure. Preferably, the channel and the rib are configured so that the rib defines a corner edge of the floorboard. To this end, an outer edge of the channel may be spaced below the substantially flat upper surface of the floor of the vehicle. The channel may be one-sided.

In accordance with another aspect of the present invention, a floorboard for a vehicle comprises a rigid structure defining a substantially flat upper surface of a floor for the vehicle extending between first and second side edges of the substantially flat upper surface, and first and second channels adjacent the first and second side edges of the substantially flat upper surface, respectively. A resilient member having a main section defines an upper surface for the floorboard and first and second ribs coupled to first and second side edges of the main section. The first and second ribs are configured to be received by the first and second channels, respectively, for at least partially securing the resilient member to the rigid structure. The rigid structure may comprise a first member defining the substantially flat upper surface of the floor for the vehicle and the first and second side edges of the substantially flat upper surface, and second members which, together with the first and second side edges of the substantially flat upper surface, define the first and second channels. The resilient member may further comprise pull tabs extending therefrom for further securing the resilient member to the rigid structure. The floorboard may be formed as two floorboard members abutting between the first and second side edges of the substantially flat upper surface, as shown in the illustrated embodiment. The first and second channels may be one-sided.

In accordance with yet another aspect of the present invention, a floorboard for a vehicle comprises a rigid floor panel. The rigid floor panel comprises a generally L-shaped rigid floor member having a side edge defined along a short leg of the floor member, a long leg of the floor member defining a substantially flat upper surface of a floor for the vehicle, and a rigid channel forming member having a first planar portion secured to and extending the short leg of the floor member and a flange extending away from the first planar portion to define a channel along the side edge of the floor member. A generally L-shaped elastic mat has a long leg of the elastic mat which defines an upper surface of the floorboard and a short leg of the elastic mat defining a rib configured to be received within the channel for at least partially securing the elastic mat to the floor panel. The flange may comprise a generally S-shaped portion of the rigid channel forming member. The elastic mat may comprise pull tabs extending therefrom for further securing the elastic mat to holes extending through the rigid floor panel. At least one of the pull tabs is spaced no more than 21 mm from the rib so as to assist in maintaining the rib positioned within the channel. Preferably, the channel and the rib are configured so that the rib defines a corner edge of the floorboard. To this end, an outer edge of the channel is spaced below the substantially flat upper surface of the floor of the vehicle. Also, the short leg of the mat may extend over an edge of the flange.

In accordance with still another aspect of the present invention, a method for forming a floorboard for a vehicle comprises forming a rigid floor panel having a substantially flat upper surface defining a floor for the vehicle and a channel adjacent a side edge of the flat upper surface. A resilient member is formed to define an upper surface for the floorboard and a rib along a side edge thereof with the rib being configured to be received by the channel. The rib is engaged with the channel to at least partially secure the resilient member to the rigid floor panel. The method may further comprise forming holes through the rigid floor panel and forming pull tabs extending from the resilient member with the pull tabs being aligned with the holes when the resilient member is aligned with the rigid floor panel. The resilient member is further secured to the rigid floor panel by extending the pull tabs through the holes. The rib and the channel are preferably sized so that the rib defines a corner edge of the floorboard.

In accordance with an additional aspect of the present invention, a method of securing an elastic mat to a rigid floor panel to form a floorboard for a vehicle comprises forming a rigid floor panel having a substantially flat upper surface defining a floor for the vehicle and a channel adjacent a side edge of the flat upper surface. An elastic mat is formed to define an upper surface for the floorboard and includes a side edge and a rib along the side edge with the rib being configured to be received by the channel. The elastic mat is assembled to the rigid floor panel so that the rib engages the channel. The method may further comprise forming holes through the rigid floor panel, forming pull tabs extending from the elastic mat, the pull tabs being aligned with the holes when the elastic mat is aligned with the rigid floor panel, and further securing the resilient member to the rigid floor panel by extending the pull tabs through the holes.

In accordance with yet still another aspect of the present invention, a method for forming a floorboard for a vehicle comprises forming a rigid floor panel having a substantially flat upper surface defining a floor for the vehicle and first and second channels adjacent first and second side edges of the substantially flat upper surface, respectively. A resilient member is formed to define an upper surface for the floorboard and first and second ribs along first and second side edges thereof with the first and second ribs being configured to be received within the first and second channels. The first and second ribs being engaged with the first and second channels to at least partially secure the resilient member to the rigid floor panel.

It is an object of the present invention to provide an improved floorboard for vehicles, such as materials handling vehicles, wherein a mat can be secured quickly to a floor panel preferably without the need for adhesives.

Other objects and advantages of the invention will be apparent from the following description, the accompanying drawings and the appended claims.

BRIEF DESCRIPTION OF THE DRAWINGS

FIGS. 4–7 are sectioned end views of alternate embodiments of the floorboard of the present invention.

DETAILED DESCRIPTION OF THE INVENTION

Figure 1:
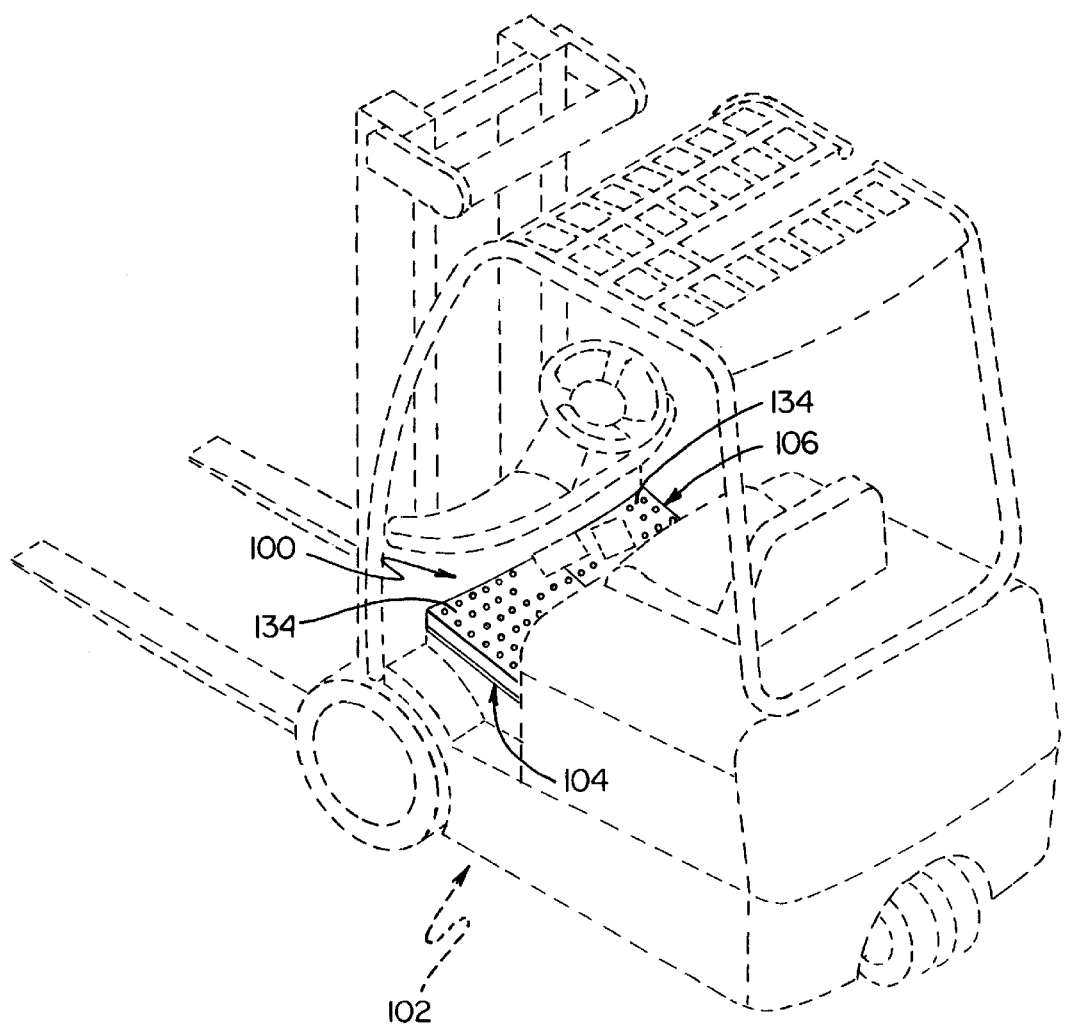
FIG. 1 is a perspective view of the floorboard of the present application as used in a counterbalance lift truck.

While the invention is generally applicable, it will be described herein with reference to materials handling vehicles and, in particular, with reference to a counterbalance lift truck for which it is initially being used. Reference will now be made to the drawings wherein FIG. 1 is a perspective view showing the floorboard 100 of the present invention in a counterbalance lift truck 102 which is shown in dashed lines. In the illustrated embodiment, the floorboard 100 comprises two halves, first and second halves 104, 106, see FIGS. 2 and 3, which are abutted with one another and rest upon a frame portion F of the truck 102, see FIGS. 5–7, when installed on the truck 102. Since the halves 104, 106 are generally mirror images of one another, with the exception of structural differences necessary to accommodate their installation on the truck 102, like elements of the halves 104, 106 will be identified by like reference numerals herein. As should be apparent, the present invention is equally applicable to floorboards which are made as a single unit which can be readily envisioned by joining the two halves 104, 106 at the line where they abut one another for installation on the truck 102.

Figure 2:
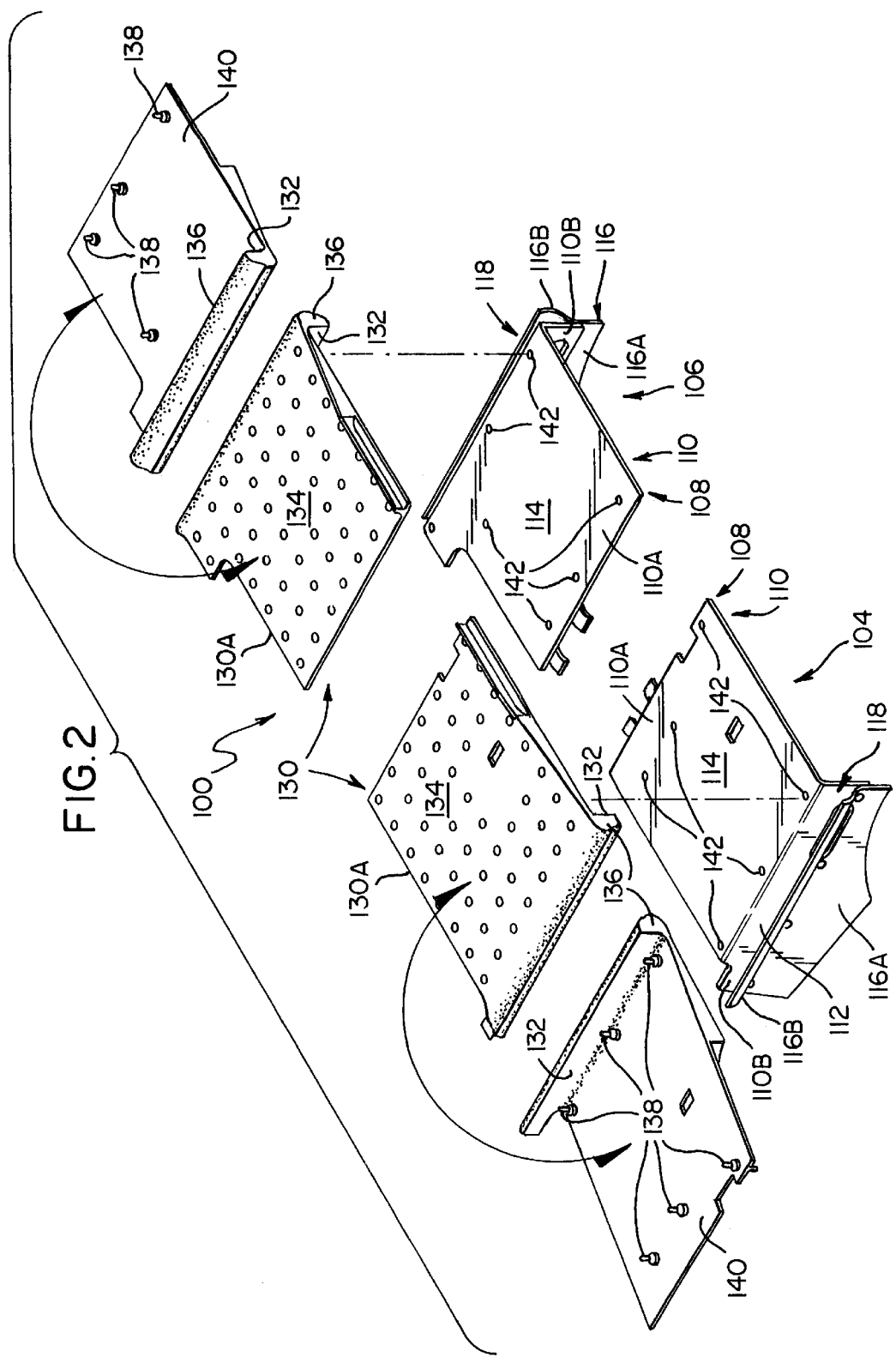
FIG. 2 is an exploded perspective view of the floorboard of FIG. 1 showing the upper and lower surfaces of resilient members or elastic mats of the floorboard.
Figure 3:
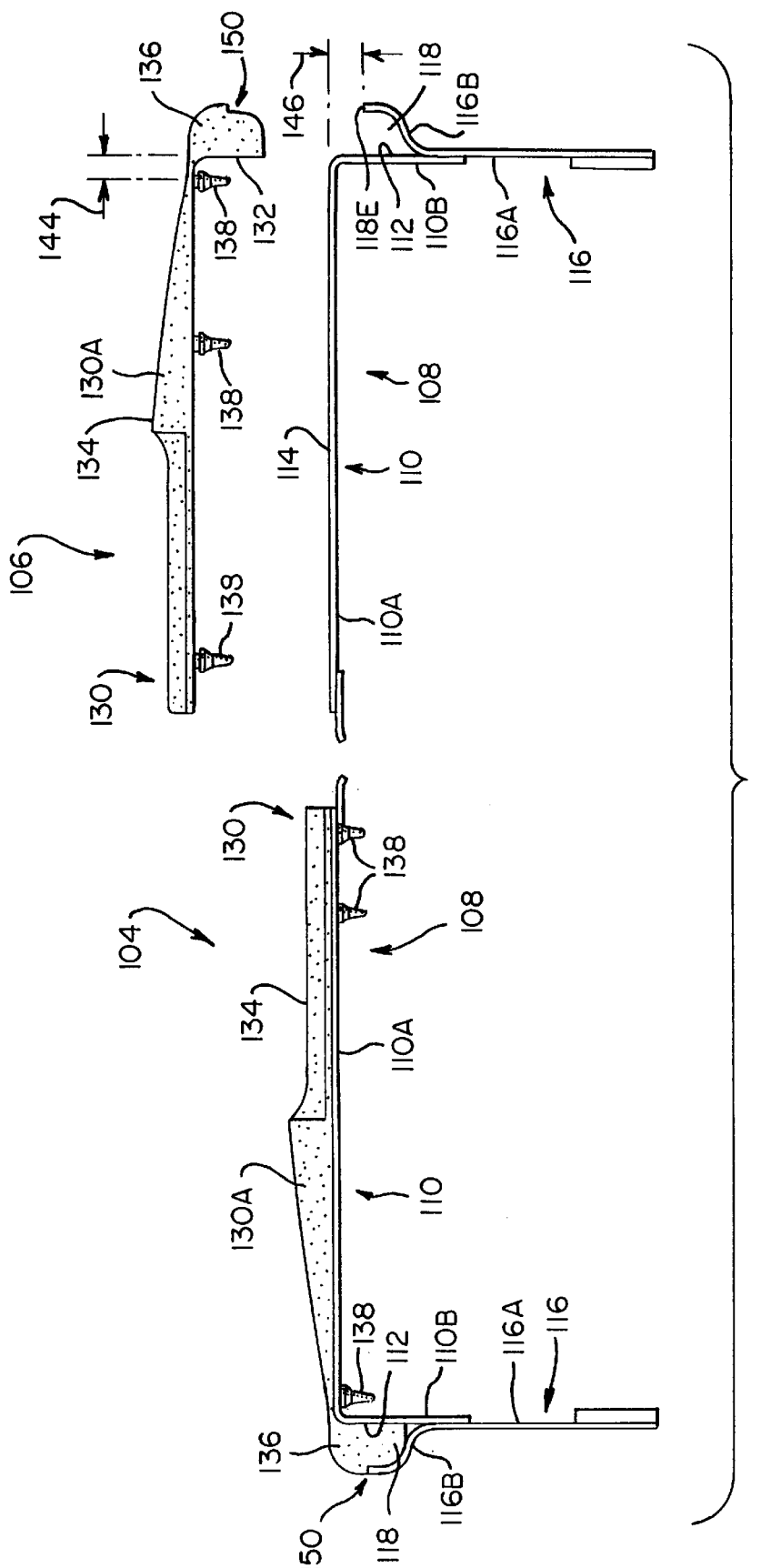
FIG. 3 is a partially exploded end view of the floorboard of FIG. 1 showing an elastic mat attached to a rigid floor panel and an elastic mat separated from a rigid floor panel.

As shown in FIGS. 2 and 3, the first half 104 of the floorboard 100 comprises a rigid floor panel or rigid structure 108 including a rigid floor member or first member 110 having a side edge 112 and defining a first portion of a substantially flat upper surface 114 of a floor for the vehicle, here the truck 102. The first member 110 is generally L-shaped having a long leg 110A defining the first upper surface portion of the floor and a short leg 110B defining the side edge 112. A rigid channel forming member or second member 116 defines with the first member 110 a channel 118 adjacent the side edge 112. As illustrated in FIGS. 2 and 3, the second member 116 includes a first planar portion 116A secured to and extending along the short leg 110B of the first member 110 and a generally S-shaped flange 116B extending away from the first planar portion 116A to define the channel 118.

Of course, the flange can take other forms dependent upon the desired shape for the channel 118, see for example FIGS. 4 and 7. While the rigid structure 108 of the illustrated embodiment includes a first member 110 and a second member 116 secured to the first member 110 for example by welding, spot welding as illustrated in FIGS. 2 and 3, the second member 116 and the first member 110 can be integrally formed to define the channel 118, see for example FIGS. 5 and 6. The side edge 112 can also be angularly oriented relative to the substantially flat upper surface 114 of the floor for the vehicle, see FIGS. 4–6, and the channel 118 can be one-sided, see FIGS. 5 and 7. When the channel 118 is one-sided, pull tabs 138 may be formed from the rib 136 to better secure the rib 136 to the channel 118 as shown in dashed lines in FIGS. 5 and 7. Alternately, adhesive could be used to better hold the rib 136 in the channel 118. Because of the configuration of the open channel 118 and the rib 136, gluing operations could be quickly and conveniently performed as opposed to the prior art mat gluing procedures.

The first half 104 further includes an elastic mat or resilient member 130 having a side edge 132 defining a first portion of an upper surface 134 for the floorboard 100 and a rib 136 along the side edge 132 of the upper surface 134. The rib 136 is configured to be received by the channel 118 for at least partially securing the resilient member 130 to the first member 110. As illustrated in FIGS. 2 and 3, the resilient member 130 is a generally L-shaped elastic mat having a long leg or main section 130A defining the first upper surface portion of the floorboard 100 and a short leg defining the rib 136 which is coupled to the main section 130A. The resilient member 130 can be formed from a polymeric material such as styrene-butadiene rubber (SBR) or other appropriate material as will be apparent to those skilled in the art.

Preferably, the resilient member 130 includes mat securing pull tabs 138 extending from a lower surface 140 of the resilient member 130. The pull tabs 138 further secure the resilient member 130 to the first member 110 when the pull tabs 138 are pulled through correspondingly positioned holes 142 in first member 110, see FIGS. 2–7. At least one of the pull tabs 138 is spaced a distance 144 of no more than around 21 mm from the rib 136 so as to assist in maintaining the rib 136 within the channel 118. As illustrated, three of the pull tabs 138 are spaced 17 mm from the rib 136; however, any reasonable number of pull tabs as required for a given application can be used.

Preferably, and as illustrated herein, the rib 136 is configured relative to the channel 118 so that the rib 136 defines a corner edge of the floorboard 100 which is engaged by the foot of an operator when entering or exiting the truck 102. To this end, an outer edge 118E of the channel 118 is spaced a distance 146 below the substantially flat upper surface 114 of the floor for the truck 102. In the illustrated embodiment, the outer edge 118E is spaced about 21 mm below the surface 114. Further, the short leg of the elastic mat which defines the rib 136 extends over the outer edge 118E of the channel 118 as shown at 150.

The second half 106 of the floorboard 100 is constructed in essentially the same manner as the first half 104 and includes a rigid floor panel or rigid structure 108 and an elastic mat or resilient member 130 which are essentially the same in construction as the rigid structure 108 and the resilient member 130 forming the first half 104. However, it is apparent from FIG. 2 that the resilient member 130 of the second half 106 is provided with fewer pull tabs 138.

Having thus described the invention of the present application in detail and by reference to preferred embodiments thereof, it will be apparent that modifications and variations are possible without departing from the scope of the invention defined in the appended claims.

What is claimed is:

1. A floorboard for a vehicle comprising:
   a rigid structure defining a substantially flat upper surface of a floor for said vehicle and a channel adjacent a side edge of said substantially flat upper surface of said floor; and
   a resilient member defining an upper surface of said floorboard and a rib along a side edge of said upper surface of said floorboard, said rib being configured to be received within said channel for at least partially securing said resilient member to said rigid structure, said channel and said rib being configured so that said rib defines a corner edge of said floorboard.

2. A floorboard for a vehicle as claimed in claim 1 wherein said resilient member is formed from rubber.

3. A floorboard for a vehicle as claimed in claim 1 wherein said rigid structure comprises a first member defining said substantially flat upper surface of said floor for said vehicle and said side edge of said substantially flat upper surface, and a second member which defines with said side edge of said first member said channel.

4. A floorboard for a vehicle as claimed in claim 3 wherein said second member is integral with said first member.

5. A floorboard for a vehicle as claimed in claim 3 wherein said second member is secured to said first member.

6. A floorboard for a vehicle as claimed in claim 1 wherein said resilient member further comprises pull tabs extending therefrom for further securing said resilient member to said rigid structure.

7. A floorboard for a vehicle as claimed in claim 1 wherein an outer edge of said channel is spaced below said substantially flat upper surface of said floor of said vehicle.

8. A floorboard for a vehicle as claimed in claim 1 wherein said channel is one-sided.

9. A floorboard for a vehicle comprising:
   a rigid structure defining a substantially flat upper surface of a floor for said vehicle extending between first and second side edges of said substantially flat upper surface, and first and second channels adjacent said first and second side edges of said substantially flat upper surface, respectively; and
   a resilient member having a main section defining an upper surface for said floorboard and first and second ribs coupled to first and second side edges of said main section, said first and second ribs being configured to be received by said first and second channels, respectively, for at least partially securing said resilient member to said rigid structure.

10. A floorboard for a vehicle as claimed in claim 9 wherein said rigid structure comprises a first member defining said substantially flat upper surface of said floor for said vehicle and said first and second side edges of said substantially flat upper surface, and second members which define with said first and second side edges of said substantially flat upper surface said first and second channels.

11. A floorboard for a vehicle as claimed in claim 9 wherein said resilient member further comprises pull tabs extending therefrom for further securing said resilient member to said rigid structure.

12. A floorboard for a vehicle as claimed in claim 11 wherein said floorboard is formed as two floorboard members abutting between said first and second side edges of said substantially flat upper surface.

13. A floorboard for a vehicle as claimed in claim 9 wherein said first and second channels are one-sided.

14. A floorboard for a vehicle comprising:
   a rigid floor panel comprising:
      a generally L-shaped rigid floor member having a side edge defined along a short leg of said floor member, a long leg of said floor member defining a substantially flat upper surface of a floor for said vehicle; and
      a rigid channel forming member having a first planar portion secured to and extending said short leg of said floor member and a flange extending away from said first planar portion to define a channel along said side edge of said floor member; and
   a generally L-shaped elastic mat, a long leg of said elastic mat defining an upper surface of said floorboard and a short leg of said elastic mat defining a rib configured to be received within said channel for at least partially securing said elastic mat to said floor panel.

15. A floorboard for a vehicle as claimed in claim 14 wherein said flange comprises a generally S-shaped portion of said rigid channel forming member.

16. A floorboard for a vehicle as claimed in claim 14 wherein said elastic mat comprises pull tabs extending therefrom for further securing said elastic mat to holes extending through said rigid floor panel.

17. A floorboard for a vehicle as claimed in claim 16 wherein at least one of said pull tabs is spaced no more than 21 mm from said rib so as to assist in maintaining said rib positioned within said channel.

18. A floorboard for a vehicle as claimed in claim 14 wherein said channel and said rib are configured so that said rib defines a corner edge of said floorboard.

19. A floorboard for a vehicle as claimed in claim 18 wherein an outer edge of said channel is spaced below said substantially flat upper surface of said floor of said vehicle.

20. A floorboard for a vehicle as claimed in claim 14 wherein said short leg of said mat extends over an edge of said flange.

21. A method for forming a floorboard for a vehicle comprising the steps of:
   forming a rigid floor panel having a substantially flat upper surface defining a floor for said vehicle and a channel adjacent a side edge of said flat upper surface;
   forming a resilient member defining an upper surface for said floorboard and a rib along a side edge thereof, said rib being configured to be received by said channel;
   engaging said rib with said channel to at least partially secure said resilient member to said rigid floor panel; and
   sizing said rib and said channel so that said rib defines a corner edge of said floorboard.

22. The method of claim 21 further comprising the steps of:
   forming holes through said rigid floor panel;
   forming pull tabs extending from said resilient member, said pull tabs being aligned with said holes when said resilient member is aligned with said rigid floor panel; and
   further securing said resilient member to said rigid floor panel by extending said pull tabs through said holes.

23. A method of securing an elastic mat to a rigid floor panel to form a floorboard for a vehicle, said method comprising the steps of:
   forming a rigid floor panel having a substantially flat upper surface defining a floor for said vehicle and a channel adjacent a side edge of said flat upper surface;
   forming an elastic mat to define an upper surface for said floorboard and including a side edge and a rib along said side edge, said rib being configured to be received by said channel;
   assembling said elastic mat to said rigid floor panel so that said rib engages said channel; and
   sizing said rib and said channel so that said rib defines a corner edge of said floorboard.

24. The method of claim 23 further comprising the steps of:
   forming holes through said rigid floor panel;
   forming pull tabs extending from said elastic mat, said pull tabs being aligned with said holes when said elastic mat is aligned with said rigid floor panel; and
   further securing said resilient member to said rigid floor panel by extending said pull tabs through said holes.

25. A method for forming a floorboard for a vehicle comprising the steps of:
   forming a rigid floor panel having a substantially flat upper surface defining a floor for said vehicle and first and second channels adjacent first and second side edges of said substantially flat upper surface, respectively;
   forming a resilient member defining an upper surface for said floorboard and first and second ribs along first and second side edges thereof, said first and second ribs being configured to be received within said first and second channels; and
   engaging said first and second ribs with said first and second channels to at least partially secure said resilient member to said rigid floor panel.

26. A floorboard for a vehicle comprising:
   a rigid structure defining a substantially flat upper surface of a floor for said vehicle and a channel adjacent a side edge of said substantially flat upper surface of said floor, said rigid structure comprising a first member defining said substantially flat upper surface of said floor for said vehicle and said side edge of said substantially flat upper surface, and a second member which defines with said side edge of said first member said channel; and
   a resilient member defining an upper surface of said floorboard and a rib along a side edge of said upper surface of said floorboard, said rib being configured to be received within said channel for at least partially securing said resilient member to said rigid structure.

27. A floorboard for a vehicle as claimed in claim 26 wherein said second member is integral with said first member.

28. A floorboard for a vehicle as claimed in claim 26 wherein said second member is secured to said first member.

29. A floorboard for a vehicle as claimed in claim 26 wherein said resilient member further comprises pull tabs extending therefrom for further securing said resilient member to said rigid structure.

30. A floorboard for a vehicle as claimed in claim 26 wherein said channel and said rib are configured so that said rib defines a corner edge of said floorboard.

31. A floorboard for a vehicle as claimed in claim 30 wherein an outer edge of said channel is spaced below said substantially flat upper surface of said floor of said vehicle.

32. A floorboard for a vehicle as claimed in claim 26 wherein said channel is one-sided.

33. A floorboard for a vehicle comprising:
   a rigid structure defining a substantially flat upper surface of a floor for said vehicle and a channel adjacent a side edge of said substantially flat upper surface of said floor; and
   a resilient member defining an upper surface of said floorboard and a rib along a side edge of said upper surface of said floorboard, said rib being configured to be received within said channel for at least partially securing said resilient member to said rigid structure and said resilient member further comprising pull tabs extending therefrom for further securing said resilient member to said rigid structure.

34. A method for forming a floorboard for a vehicle comprising the steps of:
   forming a rigid floor panel having a substantially flat upper surface defining a floor for said vehicle and a channel adjacent a side edge of said flat upper surface;
   forming a resilient member defining an upper surface for said floorboard and a rib along a side edge thereof, said rib being configured to be received by said channel;

engaging said rib with said channel to at least partially secure said resilient member to said rigid floor panel;

forming holes through said rigid floor panel;

forming pull tabs extending from said resilient member, said pull tabs being aligned with said holes when said resilient member is aligned with said rigid floor panel; and further securing said resilient member to said rigid floor panel by extending said pull tabs through said holes.

35. A method of securing an elastic mat to a rigid floor panel to form a floorboard for a vehicle, said method comprising the steps of:

forming a rigid floor panel having a substantially flat upper surface defining a floor for said vehicle and a channel adjacent a side edge of said flat upper surface;

forming an elastic mat to define an upper surface for said floorboard and including a side edge and a rib along said side edge, said rib being configured to be received by said channel;

assembling said elastic mat to said rigid floor panel so that said rib engages said channel;

forming holes through said rigid floor panel;

forming pull tabs extending from said elastic mat, said pull tabs being aligned with said holes when said elastic mat is aligned with said rigid floor panel; and further securing said resilient member to said rigid floor panel by extending said pull tabs through said holes.

* * * * *